US012424072B2

(12) United States Patent
Yu et al.

(10) Patent No.: US 12,424,072 B2
(45) Date of Patent: Sep. 23, 2025

(54) MANAGEMENT SYSTEM APPARATUS FOR PERFORMING RISK SITUATION DETERMINATION IN INDOOR SPACE USING MULTIPLE SENSORS AND THE OPERATING METHOD THEREOF

(71) Applicant: FRANKLIN TECHNOLOGY INC., Seoul (KR)

(72) Inventors: Changsoo Yu, Hwaseong-si (KR); Ok Chae Kim, Seoul (KR)

(73) Assignee: FRANKLIN TECHNOLOGY INC., Seoul (KR)

( * ) Notice: Subject to any disclaimer, the term of this patent is extended or adjusted under 35 U.S.C. 154(b) by 157 days.

(21) Appl. No.: 18/407,458

(22) Filed: Jan. 9, 2024

(65) Prior Publication Data

US 2024/0355188 A1 Oct. 24, 2024

(30) Foreign Application Priority Data

Apr. 18, 2023 (KR) ........................ 10-2023-0050679

(51) Int. Cl.
*G08B 21/04* (2006.01)

(52) U.S. Cl.
CPC ..... *G08B 21/0469* (2013.01); *G08B 21/0492* (2013.01)

(58) Field of Classification Search
CPC ............ G08B 21/0469; G08B 21/0492; G08B 29/188
See application file for complete search history.

(56) References Cited

U.S. PATENT DOCUMENTS

| | | | | |
|---|---|---|---|---|
| 11,836,805 B1 * | 12/2023 | Culbertson, II | ....... | G06Q 40/08 |
| 2020/0231110 A1 * | 7/2020 | Lebron | ................ | G08B 25/016 |

FOREIGN PATENT DOCUMENTS

| | | | |
|---|---|---|---|
| JP | 2020-149339 | A | 9/2020 |
| KR | 10-2011-0053815 | A | 5/2011 |
| KR | 10-1475390 | B1 | 12/2014 |
| KR | 10-2019-0020951 | A | 3/2019 |
| KR | 10-2440530 | B1 | 9/2022 |

* cited by examiner

*Primary Examiner* — Davetta W Goins
*Assistant Examiner* — Sharmin Akhter
(74) *Attorney, Agent, or Firm* — Park, Kim & Suh, LLC

(57) ABSTRACT

Disclosed is a management system apparatus for performing risk situation determination in an indoor space using multiple sensors and the operating method thereof to support a guardian to quickly determine a risk situation which occurs in an indoor space.

11 Claims, 2 Drawing Sheets

MANAGEMENT SYSTEM APPARATUS FOR PERFORMING RISK SITUATION DETERMINATION IN INDOOR SPACE USING MULTIPLE SENSORS AND THE OPERATING METHOD THEREOF

CROSS-REFERENCE TO RELATED APPLICATIONS

This application claims priority to and the benefit of Korean Patent Application No. 10-2023-0050679 filed in the Korean Intellectual Property Office on Apr. 18, 2023, the entire contents of which are incorporated herein by reference.

TECHNICAL FIELD

The present disclosure relates to a management system apparatus for performing risk situation determination in an indoor space using multiple sensors and the operating method thereof.

BACKGROUND ART

Recently, as the elderly population increases, problems related to an elderly person living alone are becoming more serious. Elderly persons who live alone, who do not live with their spouses or relatives, and who have to make a living on their own often experience emotional difficulties such as feelings of alienation or loneliness, and even when a risk situation requiring emergency rescue reporting occurs due to aging or illness, there is a problem in that it is difficult for the elderly persons to receive a help from others.

In the related art, in order to check whether a risk situation occurs for an elderly person living alone, a method is mainly used to install a home CCTV in a house and then have the guardian of the elderly person living alone monitor the situation of the elderly person living alone. However, if the risk situation occurs for the elderly person living alone, it is important to detect the risk situation early and take an action and in reality, it is difficult for the guardian of the elderly person living alone to continuously check the situation of the elderly person living alone through CCTV, so when the risk situation occurs for the elderly person living alone, there is a problem that it is difficult to respond to the risk situation quickly. Meanwhile, recently, in that thanks to the advancement of technology, various sensors such as temperature sensors, humidity sensors, fine dust detection sensors, etc. have been released, in order to check whether the risk situation occurs to the elderly person living alone, a method for using the sensors may be considered.

In this regard, if a technology is introduced in which it is confirmed whether there is an elderly person living alone in the indoor space through a passive infrared human body detection sensor, and if it is confirmed that there is the elderly person living alone in the indoor space, various risk situations in the indoor space are comprehensively determined by using multiple sensors such as temperature sensors, humidity sensors, etc., and then when it is determined that the risk situation occurs in the indoor space, a notification can be transmitted to the guardian of the elderly person living alone, the guardian of the elderly person living alone can quickly determine the risk situation which occurs to the elderly person living alone in the indoor space without continuously monitoring the situation of the elderly person living alone, and respond to the risk situation quickly.

SUMMARY OF THE INVENTION

The present disclosure provides a management system apparatus for performing risk situation determination in an indoor space using multiple sensors and the operating method thereof to support a guardian to quickly determine a risk situation which occurs in an indoor space.

An exemplary embodiment of the present disclosure provides a management system apparatus for performing determination of a risk situation in an indoor space, which includes a passive infrared human body detection sensor for detecting a human object present in the indoor space, a temperature sensor, a humidity sensor, a fine dust detection sensor, a carbon dioxide detection sensor, a smoke sensor, and a motion detection sensor, which includes: a determination event generation unit generating a determination event for determining whether a risk situation is present in the indoor space at a predetermined determination cycle interval; when the determination event is generated, an acquisition unit checking whether the human object is detected in the indoor space through the passive infrared human body detection sensor, and when it is confirmed that the human object is detected as a result of the checking, acquires n (n is a natural number of 2 or more) temperature measurement values, n humidity measurement values, n fine dust measurement values, n carbon dioxide measurement values, and n smoke measurement values measured continuously through the temperature sensor, the humidity sensor, the fine dust detection sensor, the carbon dioxide detection sensor, and the smoke sensor at the predetermined measurement cycle interval, and at the same time, acquiring n discrimination values related to whether motions measured continuously through the motion detection sensor at the measurement cycle interval are detected; a score generation unit generating a first score representing an indoor discomfort level for the indoor space based on the n temperature measurement values and the n humidity measurement values, generating a second score representing an indoor pollution level for the indoor space based on the n fine dust measurement values and the n carbon dioxide measurement values, generating a third score representing a fire risk level in the indoor space based on the n smoke measurement values, and generating a fourth score for discriminating whether the motion of the human object is abnormal based on the n discrimination values; and a notification transmission unit transmitting a first notification message indicating that the indoor discomfort level in the indoor space is high to a predetermined guardian terminal when the first score is more than a predetermined first reference value, transmitting a second notification message indicating that an indoor pollution level in the indoor space is high to the guardian terminal when the second score is more than a predetermined second reference value, transmitting a third notification message indicating that there is a fire risk in the indoor space to the guardian terminal when the third score is more than a predetermined third reference value, and transmitting a fourth notification message indicating that the motion of the human object is abnormal to the guardian terminal when the fourth score is more than a predetermined fourth reference value to notify that there is the risk situation in the indoor space.

Another exemplary embodiment of the present disclosure provides an operating method of a management system apparatus for performing determination of a risk situation in an indoor space, which includes a passive infrared human body detection sensor for detecting a human object present in the indoor space, a temperature sensor, a humidity sensor, a fine dust detection sensor, a carbon dioxide detection sensor, a smoke sensor, and a motion detection sensor, which includes: generating a determination event for determining whether a risk situation is present exists in the indoor space at a predetermined determination cycle interval; when the determination event is generated, checking whether the human object is detected in the indoor space through the passive infrared human body detection sensor, and when it is confirmed that the human object is detected as a result of the checking, acquires n (n is a natural number of 2 or more) temperature measurement values, n humidity measurement values, n fine dust measurement values, n carbon dioxide measurement values, and n smoke measurement values measured continuously through the temperature sensor, the humidity sensor, the fine dust detection sensor, the carbon dioxide detection sensor, and the smoke sensor at the predetermined measurement cycle interval, and at the same time, acquiring n discrimination values related to whether motions measured continuously through the motion detection sensor at the measurement cycle interval are detected; generating a first score representing an indoor discomfort level for the indoor space based on the n temperature measurement values and the n humidity measurement values, generating a second score representing an indoor pollution level for the indoor space based on the n fine dust measurement values and the n carbon dioxide measurement values, generating a third score representing a fire risk level in the indoor space based on the n smoke measurement values, and generating a fourth score for discriminating whether the motion of the human object is abnormal based on the n discrimination values; and transmitting a first notification message indicating that the indoor discomfort level in the indoor space is high to a predetermined guardian terminal when the first score is more than a predetermined first reference value, transmitting a second notification message indicating that an indoor pollution level in the indoor space is high to the guardian terminal when the second score is more than a predetermined second reference value, transmitting a third notification message indicating that there is a fire risk in the indoor space to the guardian terminal when the third score is more than a predetermined third reference value, and transmitting a fourth notification message indicating that the motion of the human object is abnormal to the guardian terminal when the fourth score is more than a predetermined fourth reference value to notify that there is the risk situation in the indoor space.

The present disclosure provides a management system apparatus for performing risk situation determination in an indoor space using multiple sensors and the operating method thereof to support a guardian to quickly determine a risk situation which occurs in an indoor space.

DETAILED DESCRIPTION

Figure 1:
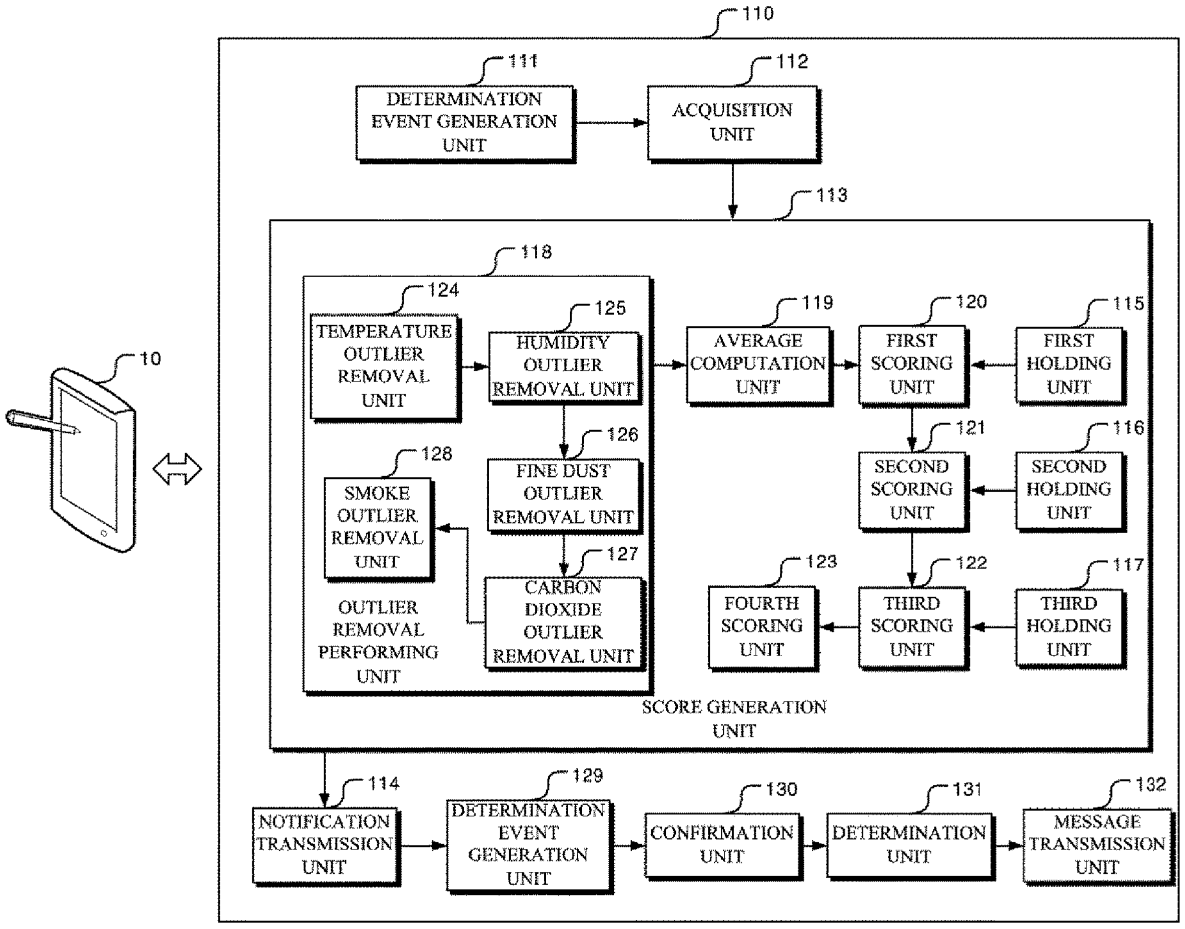
FIG. 1 is a diagram illustrating a structure of a management system apparatus according to an exemplary embodiment of the present disclosure.

Hereinafter, exemplary embodiments of the present disclosure will be described in detail with reference to the accompanying drawings. The description does not limit the present disclosure to specific exemplary embodiments, and it should be understood that the present disclosure covers all the modifications, equivalents and replacements included within the idea and technical scope of the present disclosure. In describing each drawing, like reference numerals refer to like elements and if not contrarily defined, all terms used herein including technological or scientific terms have the same meanings as those generally understood by a person with ordinary skill in the art.

In this document, unless explicitly described to the contrary, the word "comprise" and variations such as "comprises" or "comprising", will be understood to imply the inclusion of stated elements but not the exclusion of any other elements. Further, in various exemplary embodiments of the present disclosure, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning compute program instructions mounted on a processor or a memory of data processible equipment such as a universal computer, a special computer, a portable notebook computer, a network computer, etc., and performing designated functions. Since the computer program instructions may be stored in a memory provided in a computer device or a computer readable memory, functions described in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are subsequently illustrated are substantially simultaneously carried out, or may be performed in a reverse order, and in some cases, the functions may be performed while some blocks or steps are omitted.

FIG. 1 is a diagram illustrating a structure of a management system apparatus according to an exemplary embodiment of the present disclosure.

The management system apparatus 110 according to the present disclosure as an apparatus for performing determination of a risk situation in an indoor space may include a passive infrared human body detection sensor for detecting a human object present in the indoor space, a temperature sensor, a humidity sensor, a fine dust detection sensor, a carbon dioxide detection sensor, a smoke sensor, and a motion detection sensor.

In such a situation, referring to FIG. 1, the management system apparatus 110 according to the present disclosure includes a determination event generation unit 111, an acquisition unit 112, a score generation unit 113, and a notification transmission unit 114.

The determination event generation unit 111 generates a determination event for determining whether a risk situation is present exists in the indoor space at a predetermined determination cycle interval.

For example, when the predetermined determination cycle is '10 minutes', the determination event generation unit 111 generates the determination event for determining whether the risk situation is present exists in the indoor space at an interval of '10 minutes'.

When the determination event is generated, the acquisition unit 112 checks whether the human object is detected in the indoor space through the passive infrared human body detection sensor, and when it is confirmed that the human object is detected as a result of the checking, acquires n (n is a natural number of 2 or more) temperature measurement values, n humidity measurement values, n fine dust measurement values, n carbon dioxide measurement values, and n smoke measurement values measured continuously through the temperature sensor, the humidity sensor, the fine dust detection sensor, the carbon dioxide detection sensor, and the smoke sensor at the predetermined measurement cycle interval, and at the same time, acquires n discrimination values related to whether motions measured continuously through the motion detection sensor at the measurement cycle interval are detected.

For example, it is assumed that n is '30', the predetermined measurement cycle is '10 seconds', and the human object is detected in the indoor space through the passive infrared human body detection sensor.

Then, the acquisition unit 112 may acquire '30' temperature measurement values, '30' humidity measurement values, '30' fine dust measurement values, '30' carbon dioxide measurement values, and '30' smoke measurement values measured continuously through the temperature sensor, the humidity sensor, the fine dust detection sensor, the carbon dioxide detection sensor, and the smoke sensor at an interval of '10 seconds'.

In this regard, the temperature sensor measures a temperature of the indoor space continuously '30' times at the interval of '10' seconds to generate '30' temperature measurement values. For example, when the temperature sensor starts to measure the temperature for the indoor space from '10:30', the temperature sensor measures the temperature '30 times' continuously at the interval of '10 seconds' like '10:30: 18.7° C., 10:30:10:18.6° C., 10:30:20:18.7° C., . . . , 10:34:40:19° C., and 10:34:50:19° C.' to generate '30' temperature measurement values like '18.7° C., 18.6° C., 18.7° C., 12.7° C., 18.7° C., . . . , 38.8° C., 18.9° C., 18.9° C., 19° C., and 19° C.'.

The humidity sensor measures the humidity of the indoor space continuously at '30' times at the interval of '10 seconds' like '10:30:47%, 10:30:10:46.8%, 10:30:20: 46.9%, 10:34:40:47.9%, and 10:34:50: 48%' to generate '30' humidity measurement values like "47%, 46.8%, 46.9%, 46.9%, 47%, . . . , 47.7%, 47.8%, 47.9%, 47.9%, and 48%'.

By such a scheme, the fine dust detection sensor starts measuring from '10:30' and measures the concentration of fine dust present in the indoor space continuously '30' times at the interval of '10 second' to generate '30' fine dust measurement values like '240 μg/m$^3$, 240.1 μg/m$^3$, 240.1 μg/m$^3$, 240.2 μg/m$^3$, 240.3 μg/m$^3$, . . . , 240.5 μg/m$^3$, 240.8 μg/m$^3$, 241.4 μg/m$^3$, 241.3 μg/m$^3$, and 240.9 μg/m$^3$', the carbon dioxide detection sensor starts measuring from '10: 30' and measures the concentration of carbon dioxide present in the indoor space continuously '30' times at the interval of '10 seconds' to generate '30' carbon dioxide measurement values like '728 ppm, 728 ppm, 729 ppm, 729 ppm, 730 ppm, . . . , 728 ppm, 729 ppm, 728 ppm, 729 ppm, and 730 ppm', and the smoke sensor starts measuring from '10:30' and measures the concentration of smoke present in the indoor space continuously '30' times at the interval of '10 seconds' to generate '30' smoke measurement values like '0.3%/m, 0.2%/m, 0.2%/m, 0.3%/m, 0.3%/m, . . . , 0.3%/m, 0.4%/m, 0.3%/m, 0.3%/m, and 0.2%/m'.

As a result, the acquisition unit 112 may simultaneously acquire '18.7° C., 18.6° C., 18.7° C., 12.7° C., 18.7° C., . . . , 38.8° C., 18.9° C., 18.9° C., 19° C., and 19° C.' which are '30' temperature measurement values, '47%, 46.8%, 46.9%, 46.9%, 47%, 47.7%, 47.8%, 47.9%, 47.9%, and 48%' which are '30' humidity measurement values, '240 μg/m$^3$, 240.1 μg/m$^3$, 240.1 μg/m$^3$, 240.2 μg/m$^3$, 240.3 μg/m$^3$, . . . , 240.5 μg/m$^3$, 240.8 μg/m$^3$, 241.4 μg/m$^3$, 241.3 μg/m$^3$, and 240.9 μg/m$^3$' which are '30' fine dust measurement values, '728 ppm, 728 ppm, 729 ppm, 729 ppm, 730 ppm, . . . , 728 ppm, 729 ppm, 728 ppm, 729 ppm, and 730 ppm' which are '30' carbon dioxide measurement values, and '0.3%/m, 0.2%/m, 0.2%/m, 0.3%/m, 0.3%/m, . . . , 0.3%/m, 0.4%/m, 0.3%/m, 0.3%/m, and 0.2%/m' which are '30' smoke measurement values.

At the same time, the acquisition unit 112 may acquire '30' discrimination values for whether motions are detected which are continuously measured through the motion detection sensor at the interval of '10 second'.

Here, the discrimination value for whether the motion is detected is a value that indicates a discrimination result for whether the motion is detected, and a discrimination value of '1' may be configured to be assigned when the motion is detected as the person moves and a discrimination value '0' may be configured to be assigned when the motion is not detected as the person does not move, and in this case, the motion detection sensor may be a sensor that detects the motion of the person at the interval of '10 seconds' to generate the discrimination value of '1' or '0'.

In such a situation, when the motion detection sensor starts measuring from '10:30', the motion detection sensor may detect the motion of the human object continuously '30' times at the interval of '10 seconds', and in this regard, the motion detection sensor discriminates whether the motion of the human object is detected like '10:30: no motion detected, 10:30:10: no motion detected, 10:30:20: motion detected, . . . , 10:34:40: motion detected, and 10:34:50: no motion detected' to generate '30 discrimination values' like '0, 0, 1, 1, 1, . . . , 1, 0, 1, 1, and 0', and as a result, the acquisition unit 112 may acquire '0, 0, 1, 1, 1, . . . , 1, 0, 1, 1, and 0' which are '30' discrimination values measured continuously through the motion detection sensor.

The score generation unit 113 generates a first score representing an indoor discomfort level for the indoor space based on the n temperature measurement values and the n humidity measurement values, generates a second score representing an indoor pollution level for the indoor space based on the n fine dust measurement values and the n carbon dioxide measurement values, generates a third score representing a fire risk level in the indoor space based on the n smoke measurement values, and generates a fourth score for discriminating whether the motion of the human object is abnormal based on the n discrimination values.

In this case, according to an exemplary embodiment of the present disclosure, the score generation unit 113 may include a first holding unit 115, a second holding unit 116, a third holding unit 117, an outlier removal performing unit 118, an average computation unit 119, a first scoring unit 120, a second scoring unit 121, a third scoring unit 122, and a fourth scoring unit 123 as a specific configuration for generating the first to fourth scores.

The first holding unit 115 stores and holds a pre-designated first table and a pre-designated second table for calculating a score representing an indoor discomfort level.

Here, in the first table, a plurality of pre-designated first partial scores and pre-designated temperature range values corresponding to the plurality of first partial scores, respectively are recorded, and in the second table, a plurality of pre-designated second partial scores and pre-designated humidity range values corresponding to the plurality of second partial scores, respectively are recorded.

For example, the first table may be configured as in Table 1 below, and the second table may be configured as in Table 2 below.

TABLE 1

| Plural first partial scores | Temperature range value |
|---|---|
| 10 | Less than 15° C. |
| 20 | 15° C. or more or less than 20° C. |
| 30 | 20° C. or more or less than 25° C. |
| 40 | 25° C. or more or less than 30° C. |
| 50 | 30° C. or more |

TABLE 2

| Plural second partial scores | Humidity range value |
|---|---|
| 10 | Less than 40% |
| 20 | 40% or more or less than 60% |
| 30 | 60% or more or less than 70% |
| 40 | 70% or more or less than 80% |
| 50 | 80% or more |

The second holding unit 116 stores and holds a pre-designated third table and a pre-designated fourth table for calculating a score representing an indoor pollution level.

Here, in the third table, a plurality of pre-designated third partial scores and pre-designated fine dust range values corresponding to the plurality of third partial scores, respectively are recorded, and in the fourth table, a plurality of pre-designated fourth partial scores and pre-designated carbon dioxide range values corresponding to the plurality of fourth partial scores, respectively are recorded.

For example, the third table may be configured as in Table 3 below, and the fourth table may be configured as in Table 4 below.

TABLE 3

| Plural third partial scores | Fine dust range value |
|---|---|
| 10 | Less than 25 $\mu g/m^3$ |
| 20 | 25 $\mu g/m^3$ or more or less than 50 $\mu g/m^3$ |
| 30 | 50 $\mu g/m^3$ or more or less than 100 $\mu g/m^3$ |
| 40 | 100 $\mu g/m^3$ or more or less than 150 $\mu g/m^3$ |
| 50 | 150 $\mu g/m^3$ or more |

TABLE 4

| Plural fourth partial scores | Carbon dioxide range value |
|---|---|
| 10 | Less than 500 ppm |
| 20 | 500 ppm or more or less than 700 ppm |
| 30 | 700 ppm or more or less than 1000 ppm |
| 40 | 1000 ppm or more or less than 2000 ppm |
| 50 | 2000 ppm or more |

The third holding unit 117 stores and holds a pre-designated fifth table for calculating a score representing a fire risk level.

Here, in the fifth table, a plurality of pre-designated fifth partial scores and pre-designated smoke range values corresponding to the plurality of fifth partial scores, respectively are recorded.

For example, the fifth table may be configured as in Table 5 below.

TABLE 5

| Plural fifth partial scores | Smoke range value |
|---|---|
| 20 | Less than 1%/m |
| 40 | 1%/m or more or less than 5%/m |
| 60 | 5%/m or more or less than 10%/m |
| 80 | 10%/m or more or less than 15%/m |
| 100 | 15%/m or more |

When the n temperature measurement values, the n humidity measurement values, the n fine dust measurement values, the n carbon dioxide measurement values, the n smoke measurement values, and the n discrimination values are acquired, the outlier removal performing unit 118 removes outliers for the n temperature measurement values, the n humidity measurement values, the n fine dust measurement values, the n carbon dioxide measurement values, the n smoke measurement values, respectively.

In this case, according to an exemplary embodiment of the present disclosure, the outlier removal performing unit 118 may include a temperature outlier removal unit 124, a humidity outlier removal unit 125, a fine dust outlier removal unit 126, a carbon dioxide outlier removal unit 127, and a smoke outlier removal unit 128 as specific components for removing the outliers for the n temperature measurement values, the n humidity measurement values, the n fine dust measurement values, the n carbon dioxide measurement values, the n smoke measurement values, respectively.

When the n temperature measurement values are acquired, the temperature outlier removal unit 124 computes a difference between a first quartile and a third quartile of the n temperature measurement values to calculate an interquartile range (IQR) for the n temperature measurement values, designates a first boundary value calculated according to Equation 1 below as a first temperature boundary value, and designates a second boundary value calculated according to Equation 2 below as a second temperature boundary value, based on the IQR for the n temperature measurement values to select a temperature measurement value which does not belong between the first temperature boundary value and the second temperature boundary value as an outlier among the n temperature measurement values, and then remove the outliers for the n temperature measurement values.

$$B1 = Q1 - 1.5 \times IQR \qquad \text{[Equation 1]}$$

Where B1 means a first boundary value, Q1 means the first quartile, and IQR means an interquartile range.

$$B2 = Q2 + 1.5 \times IQR \qquad \text{[Equation 2]}$$

Where B2 means a second boundary value, Q2 means the third quartile, and IQR means an interquartile range.

When the n humidity measurement values are acquired, the humidity outlier removal unit 125 computes a difference between a first quartile and a third quartile of the n humidity measurement values to calculate an interquartile range for the n humidity measurement values, designates a first boundary value calculated according to Equation 1 above as a first humidity boundary value, and designates a second boundary value calculated according to Equation 2 above as a second humidity boundary value, based on the IQR for the n humidity measurement values to select a humidity measurement value which does not belong between the first humidity boundary value and the second humidity boundary value as the outlier among the n humidity measurement values, and then remove the outliers for the n humidity measurement values.

When the n fine dust measurement values are acquired, the fine dust outlier removal unit 126 computes a difference between a first quartile and a third quartile of the n fine dust measurement values to calculate an interquartile range for the n fine dust measurement values, designates a first boundary value calculated according to Equation 1 above as a first fine dust boundary value, and designates a second boundary value calculated according to Equation 2 above as a second fine dust boundary value, based on the IQR for the n fine dust measurement values to select a fine dust measurement value which does not belong between the first fine dust boundary value and the second fine dust boundary value as the outlier among the n fine dust measurement values, and then remove the outliers for the n fine dust measurement values.

When the n carbon dioxide measurement values are acquired, the carbon dioxide outlier removal unit 127 computes a difference between a first quartile and a third quartile of the n carbon dioxide measurement values to calculate an interquartile range for the n carbon dioxide measurement values, designates a first boundary value calculated according to Equation 1 above as a first carbon dioxide boundary value, and designates a second boundary value calculated according to Equation 2 above as a second carbon dioxide boundary value, based on the IQR for the n carbon dioxide measurement values to select a carbon dioxide measurement value which does not belong between the first carbon dioxide boundary value and the second carbon dioxide boundary value as the outlier among the n carbon dioxide measurement values, and then remove the outliers for the n carbon dioxide measurement values.

When the n smoke measurement values are acquired, the smoke outlier removal unit 128 computes a difference between a first quartile and a third quartile of the n smoke measurement values to calculate an interquartile range for the n smoke measurement values, designates a first boundary value calculated according to Equation 1 above as a first smoke boundary value, and designates a second boundary value calculated according to Equation 2 above as a second smoke boundary value, based on the IQR for the n smoke measurement values to select a smoke measurement value which does not belong between the first smoke boundary value and the second smoke boundary value as the outlier among the n smoke measurement values, and then remove the outliers for the n smoke measurement values.

Hereinafter, the operations of the temperature outlier removal unit 124, the humidity outlier removal unit 125, the fine dust outlier removal unit 126, the carbon dioxide outlier removal unit 127, and the smoke outlier removal unit 128 will be described in detail as an example.

First, as in the above example, it is assumed that n is '30', and '30' temperature measurement values are acquired as '18.7° C., 18.6° C., 18.7° C., 12.7° C., 18.7° C., . . . , 38.8° C., 18.9° C., 18.9° C., 19° C., 19° C.', and '30' humidity measurement values are acquired as '47%, 46.8%, 46.9%, 46.9%, 47%, . . . , 47.7%, 47.8%, 47.9%, 47.9%, and 48%', '30' fine dust measurement values are acquired as '240 μg/m$^3$, 240.1 μg/m$^3$, 240.1 μg/m$^3$, 240.2 μg/m$^3$, 240.3 μg/m$^3$, . . . , 240.5 μg/m$^3$, 240.8 μg/m$^3$, 241.4 μg/m$^3$, 241.3 μg/m$^3$, and 240.9 μg/m$^3$', '30' carbon dioxide measurement values are acquired as '728 ppm, 728 ppm, 729 ppm, 729 ppm, 730 ppm, . . . , 728 ppm, 729 ppm, 728 ppm, 729 ppm, and 730 ppm', and '30' smoke measurement values are acquired as '0.3%/m, 0.2%/m, 0.2%/m, 0.3%/m, 0.3%/m, . . . , 0.3%/m, 0.4%/m, 0.3%/m, 0.3%/m, and 0.2%/m' by the acquisition unit 112.

Then, the temperature outlier removal unit 124 may compute the difference between the first quartile and the third quartile of the '30' temperature measurement values, and calculate the interquartile range for the '30' temperature measurement values, and designate the first boundary value calculated according to Equation 1 above as the first temperature boundary value and designate the second boundary value calculated according to Equation 2 above as the second temperature boundary value, based on the interquartile range for '30' temperature measurement values.

In this case, the first temperature boundary value is 'a' and the second temperature boundary value is 'b', and a temperature measurement value which does not belong between 'a' which is the first temperature boundary value and 'b' which is the second temperature boundary value is '12.7° C. and 38.8° C.' among '18.7° C., 18.6° C., 18.7° C., 12.7° C., 18.7° C., . . . , 38.8° C., 18.9° C., 18.9° C., 19° C., and 19° C.' which are '30 temperature measurement values, the temperature outlier removal unit 124 selects '12.7° C. and 38.8° C.' as the outlier, and then removes '12.7° C. and 38.8° C.' which are the outliers from '18.7° C., 18.6° C., 18.7° C., 12.7° C., 18.7° C., . . . , 38.8° C., 18.9° C., 18.9° C., 19° C., and 19° C.' which are '30' temperature measurement values to remove the outliers for '30' temperature measurement values.

The humidity outlier removal unit 125 may compute the difference between the first quartile and the third quartile of the '30' humidity measurement values, and calculate the interquartile range for the '30' humidity measurement values, and designate the first boundary value calculated according to Equation 1 above as the first humidity boundary value and designate the second boundary value calculated according to Equation 2 above as the second humidity boundary value, based on the interquartile range for '30' humidity measurement values.

In this case, when the first humidity boundary value is 'c' and the second humidity boundary value is 'd', and there is no humidity measurement value which does not belong between the first humidity boundary value 'c' and the second humidity boundary value 'd' among '47%, 46.8%, 46.9%, 46.9%, 47%, . . . , 47.7%, 47.8%, 47.9%, 47.9%, and 48%' which are '30' humidity measurement values, the humidity outlier removal unit 125 does not perform outlier removal for '47%, 46.8%, 46.9%, 46.9%, 47%, . . . , 47.7%, 47.8%, 47.9%, 47.9%, and 48%' which are '30' humidity measurement values.

By such a scheme, the fine dust outlier removal unit 126, the carbon dioxide outlier removal unit 127, and the smoke outlier removal unit 128 may perform outlier removal even for '240 μg/m$^3$, 240.1 μg/m$^3$, 240.1 μg/m$^3$, 240.2 μg/m$^3$, 240.3 μg/m$^3$, . . . , 240.5 μg/m$^3$, 240.8 μg/m$^3$, 241.4 μg/m$^3$, 241.3 μg/m$^3$, and 240.9 μg/m$^3$' which are '30' fine dust measurement values, '728 ppm, 728 ppm, 729 ppm, 729 ppm, 730 ppm, . . . , 728 ppm, 729 ppm, 728 ppm, 729 ppm, and 730 ppm' which are '30' carbon dioxide measurement values, '0.3%/m, 0.2%/m, 0.2%/m, 0.3%/m, 0.3%/m, . . . , 0.3%/m, 0.4%/m, 0.3%/m, 0.3%/m, and 0.2%/m' which are '30' smoke measurement values.

The average computation unit 119 computes a temperature average which is an average of remaining temperature measurement values in which outlier removal is performed among the n temperature measurement values, computes a humidity average which is an average of remaining humidity measurement values in which outlier removal is performed among the n humidity measurement values, computes a fine dust average which is an average of remaining fine dust measurement values in which outlier removal is performed among the n fine dust measurement values, computes a carbon dioxide average which is an average of remaining carbon dioxide measurement values in which outlier removal is performed among the n carbon dioxide measurement values, and computes a smoke average which is an average of remaining smoke measurement values in which outlier removal is performed among the n smoke measurement values.

The first scoring unit 120 generates, as the first score, a sum of a partial score corresponding to a temperature range value to which the temperature average belongs among the plurality of first partial scores recorded in the first table, and a partial score corresponding to a humidity range value to which the humidity average belongs among the plurality of second partial scores recorded in the second table.

The second scoring unit 121 generates, as the second score, a sum of a partial score corresponding to a fine dust range value to which the fine dust average belongs among the plurality of third partial scores recorded in the third table, and a partial score corresponding to a carbon dioxide range value to which the carbon dioxide average belongs among the plurality of fourth partial scores recorded in the fourth table.

The third scoring unit 122 generates, as the third score, a partial score corresponding to a smoke range value to which the smoke average belongs among the plurality of fifth partial scores recorded in the fifth table.

The fourth scoring unit 123 generates, as the fourth score, the number of discrimination values determined as no motion detection among the n discrimination values.

Hereinafter, the operations of the average computation unit 119, the first scoring unit 120, the second scoring unit 121, the third scoring unit 122, and the fourth scoring unit 123 will be described in detail as an example.

First, as in the above-described example, it is assumed that n is '30', and the first to fifth tables are configured as in Tables 1 to 5 above.

It is assumed that removing the outliers for '30' temperature measurement values, '30' humidity measurement values, '30' fine dust measurement values, '30' carbon dioxide measurement values, and '30' smoke measurement values, respectively is completed by the outlier removal performing unit 118.

Then, the average computation unit 119 computes a temperature average which is an average of remaining temperature measurement values in which outlier removal is performed among '30' temperature measurement values, computes a humidity average which is an average of remaining humidity measurement values in which outlier removal is performed among '30' humidity measurement values, computes a fine dust average which is an average of remaining fine dust measurement values in which outlier removal is performed among '30' fine dust measurement values, computes a carbon dioxide average which is an average of remaining carbon dioxide measurement values in which outlier removal is performed among '30' carbon dioxide measurement values, and computes a smoke average which is an average of remaining smoke measurement values in which outlier removal is performed among '30' smoke measurement values.

In this regard, when the remaining temperature measurement values in which the outlier removal is performed among '18.7° C., 18.6° C., 18.7° C., 12.7° C., 18.7° C., . . . , 38.8° C., 18.9° C., 18.9° C., 19° C., and 19° C.' which are '30' temperature measurement values are '18.7° C., 18.6° C., 18.7° C., 18.7° C., . . . , 18.9° C., 18.9° C., 19° C., and 19° C.', the average computation unit 119 may compute the temperature average which is an average of '18.7° C., 18.6° C., 18.7° C., 18.7° C., . . . , 18.9° C., 18.9° C., 19° C., and 19° C.' as '18.9° C.'.

By such a scheme, the average computation unit 119 may compute the humidity average as '47.5%', the fine dust average as '240.6 $\mu g/m^3$', the carbon dioxide average as '728.8 ppm', and the smoke average as '0.21%/m'.

Then, the first scoring unit 120 may generate, as the first score, '40' which is a sum of '20' which is a partial score corresponding to '15° C. or more or less than 20° C.' which is a temperature range value to which '18.9° C.' which is the temperature average belongs among the plurality of first partial scores recorded in the first table, and '20' which is a partial score corresponding to '40% or more or less than 60%' which is a humidity range value to which '47.5%' which is the humidity average belongs among the plurality of second partial scores recorded in the second table.

The second scoring unit 121 may generate, as the second score, '80' which is a sum of '50' which is a partial score corresponding to '150 $\mu g/m^3$ or more' which is a fine dust range value to which 240.6 $\mu g/m^3$ which is the fine dust average belongs among the plurality of third partial scores recorded in the third table, and '30' which is a partial score corresponding to '700 ppm or more or less than 1000 ppm' which is a carbon dioxide range value to which '728.8 ppm' which is the carbon dioxide average belongs among the plurality of fourth partial scores recorded in the fourth table.

The third scoring unit 122 may generate, as the third score, '20' which is a partial score corresponding to 'less than 1%/m' which is a smoke range value to which '0.21%/m' which is the smoke average belongs among the plurality of fifth partial scores recorded in the fifth table.

The fourth scoring unit 123 generates, as the fourth score, the number of discrimination values determined as no motion detection among '30' discrimination values.

In this regard, when '30' discrimination values are '0, 0, 1, 1, 1, . . . , 1, 0, 1, 1, and 0', and the number of discrimination values which is determined as no motion detection by the motion detection sensor and to which a discrimination value of '0' is assigned among '30' discrimination values is '7', the fourth scoring unit 123 may generate '7' as the fourth score.

The notification transmission unit 114 transmits a first notification message indicating that the indoor discomfort level in the indoor space is high to a predetermined guardian terminal 10 when the first score is more than a predetermined first reference value, transmits a second notification message indicating that an indoor pollution level in the indoor space is high to the guardian terminal 10 when the second score is more than a predetermined second reference value, transmits a third notification message indicating that there is a fire risk in the indoor space to the guardian terminal 10 when the third score is more than a predetermined third reference value, and transmits a fourth notification message indicating that the motion of the human object is abnormal to the guardian terminal 10 when the fourth score is more than a predetermined fourth reference value to notify that there is the risk situation in the indoor space.

In this regard, as in the above-described example, by the first scoring unit 120, the second scoring unit 121, the third scoring unit 122, and the fourth scoring unit 123, the first score is generated as '40', the second score is generated as '80', the third score is generated as '20', and the fourth score is generated as '7'.

In this case, when a predetermined first reference value for the indoor discomfort level is '50', a predetermined second reference value for the indoor pollution level is '60', a predetermined third reference value for whether there is a fire risk is '60, and a predetermined fourth reference value for whether the motion is abnormal is '20', '40 which is the first score is not more than '50' which is the first reference value, and this means that the indoor discomfort level in the indoor space is not higher than the first reference value, so the notification transmission unit 114 may not transmit the first notification message to the guardian terminal 10.

'80' which is the second score is more than '60' which is the second reference value, and this means that the indoor pollution level in the indoor space is higher than the second reference value, so the notification transmission unit 114 may transmit the second notification message indicating that the indoor pollution level in the indoor space is high to the guardian terminal 10.

'20' which is the third score is not more than '60' which is the third reference value, and this means that the fire risk level in the indoor space is not higher than the third reference value, and '7' which is the fourth score is not more than '20' which is the fourth reference value, and this means that the motion of the human object is not abnormal, so the notification transmission unit 114 may not transmit, to the guardian terminal 10, the third notification message and the fourth notification message.

According to the exemplary embodiment of the present disclosure, the management system apparatus 110 may further include the determination event generation unit 129, the confirmation unit 130, the determination unit 131, and the message transmission unit 132.

The determination event generation unit 129 generates a determination event for determining whether an emergency situation occurs when at least one notification message of the first notification message, the second notification message, the third notification message, and the fourth notification message is transmitted to the guardian terminal 10 by the notification transmission unit 114.

When the determination event is generated, the confirmation unit 130 confirms which message of the first notification message, the second notification message, the third notification message, and the fourth notification message is transmitted to the guardian terminal 10.

The determination unit 131 determines that the emergency situation occurs when it is confirmed that the first notification message and the second notification message are simultaneously transmitted to the guardian terminal 10, or the third notification message or the fourth notification message is transmitted, according to a confirmation result of the confirmation unit 130, and determines that the emergency situation occurs only when it is confirmed that the first score is more than a predetermined first emergency reference value for determining the emergency situation for the indoor discomfort level or the second score is more than a predetermined second emergency reference value for determining an emergency situation for the indoor pollution level when it is confirmed that only the first notification message is transmitted to the guardian terminal 10 or only the second notification message is transmitted according to the confirmation result of the confirmation unit 130.

The message transmission unit 132 additionally transmits an emergency notification message for notifying that there is a situation in which an emergency measure is required to the guardian terminal 10 when it is determined that the emergency situation occurs according to the determination result of the determination unit 131.

Hereinafter, the operations of the determination event generation unit 129, the confirmation unit 130, the determination unit 131, and the message transmission unit 132 will be described in detail as an example.

First, as in the above-described example, it is assumed that the second score is '80', and the second notification message indicating that the indoor pollution level in the indoor space is high is transmitted to the guardian terminal 10 by the notification transmission unit 114.

Then, the determination event generation unit 129 may generate the determination event for determining whether the emergency situation occurs.

Then, the confirmation unit 130 may confirm which message of the first notification message, the second notification message, the third notification message, and the fourth notification message is transmitted, and as a result, the confirmation unit 130 may confirm that only the second notification message is transmitted to the guardian terminal 10.

Then, the determination unit 131 may determine whether the emergency situation occurs, and in this case, when a predetermined first emergency reference value for determining the emergency situation for the indoor discomfort level is '60', and a predetermined second emergency reference value for determining the emergency situation for the indoor pollution level is '70', the first notification message and the second notification message are not simultaneously transmitted to the guardian terminal 10, and the third notification message or the fourth notification message is not transmitted to the guardian terminal 10, but '80' which is the second score is more than '70' which is the second emergency reference value, so the determination unit 131 may determine that the emergency situation occurs.

Then, the message transmission unit 132 may additionally transmit an emergency notification message notifying that the emergency measure is required because the indoor pollution level in the indoor space is very high to the guardian terminal 10.

In this case, according to an exemplary embodiment of the present disclosure, the message transmission unit 132 may repeatedly transmit the emergency notification message to the guardian terminal 10 at a predetermined notification cycle interval until a confirmation response instruction for the emergency notification message is replied from the guardian terminal 10 after the emergency notification message is transmitted to the guardian terminal 10, and stop transmission of the emergency notification message to the guardian terminal 10 when the confirmation response instruction for the emergency notification message is replied from the guardian terminal 10.

In this regard, as in the above-described example, it is assumed that only the second notification message is transmitted to the guardian terminal 10, but it is confirmed that the second score is more than the second emergency reference value, so the emergency notification message is transmitted to the guardian terminal 10.

Thereafter, the message transmission unit 132 may repeatedly transmit the emergency notification message to the guardian terminal 10 at an interval of '2 seconds' which is a predetermined notification cycle until the confirmation response instruction for the emergency notification message is replied from the guardian terminal 10.

In this case, when the confirmation response instruction for the emergency notification message is replied from the guardian terminal 10 to the management system apparatus 110 as the guardian who possesses the guardian terminal 10 confirms the emergency notification message, and then presses a message conformation button after the emergency notification message is transmitted to the guardian terminal 10, the message transmission unit 132 may stop repeatedly transmitting the emergency notification message to the guardian terminal 10.

Figure 2:
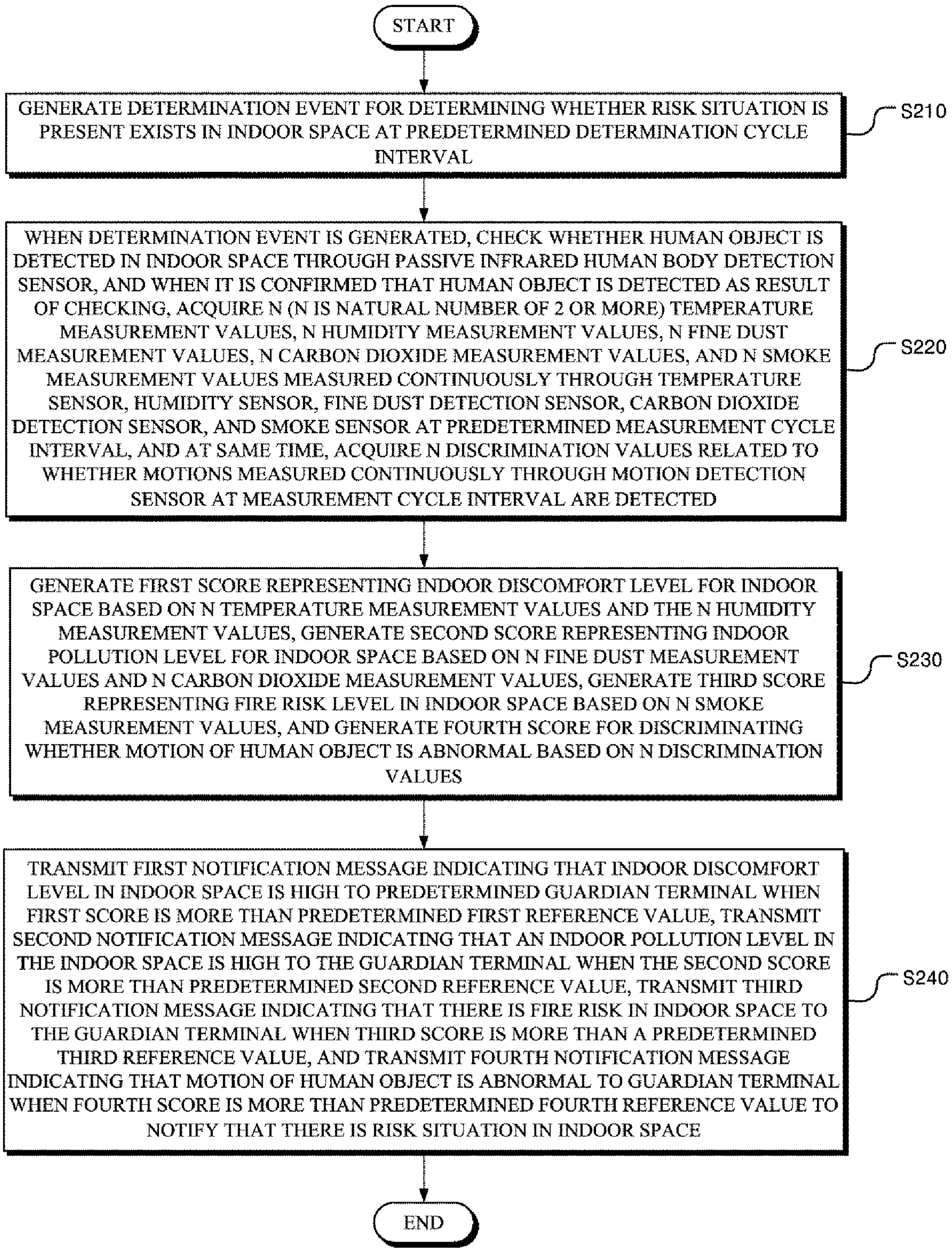
FIG. 2 is a flowchart illustrating an operating method of a management system apparatus according to an exemplary embodiment of the present disclosure.

FIG. 2 is a flowchart illustrating an operating method of a management system apparatus for performing determination of a risk situation in an indoor space, which includes a passive infrared human body detection sensor for detecting a human object present in the indoor space, a temperature sensor, a humidity sensor, a fine dust detection sensor, a carbon dioxide detection sensor, a smoke sensor, and a motion detection sensor according to an exemplary embodiment of the present disclosure.

In step S210, a determination event for determining whether a risk situation is present exists in the indoor space is generated at a predetermined determination cycle interval.

In step S220, when the determination event is generated, it is checked whether the human object is detected in the indoor space through the passive infrared human body detection sensor, and when it is confirmed that the human object is detected as a result of the checking, n (n is a natural number of 2 or more) temperature measurement values, n humidity measurement values, n fine dust measurement values, n carbon dioxide measurement values, and n smoke measurement values measured continuously are acquired through the temperature sensor, the humidity sensor, the fine dust detection sensor, the carbon dioxide detection sensor, and the smoke sensor at the predetermined measurement cycle interval, and at the same time, n discrimination values are acquired, which are related to whether motions measured continuously through the motion detection sensor at the measurement cycle interval are detected.

In step S230, a first score representing an indoor discomfort level for the indoor space is generated based on the n temperature measurement values and the n humidity measurement values, a second score representing an indoor pollution level for the indoor space is generated based on the n fine dust measurement values and the n carbon dioxide measurement values, a third score representing a fire risk level in the indoor space is generated based on the n smoke measurement values, and a fourth score for discriminating whether the motion of the human object is abnormal is generated based on the n discrimination values.

In step S240, a first notification message indicating that the indoor discomfort level in the indoor space is high is transmitted to a predetermined guardian terminal when the first score is more than a predetermined first reference value, a second notification message indicating that an indoor pollution level in the indoor space is high is transmitted to the guardian terminal when the second score is more than a predetermined second reference value, a third notification message indicating that there is a fire risk in the indoor space is transmitted to the guardian terminal when the third score is more than a predetermined third reference value, and a fourth notification message indicating that the motion of the human object is abnormal is transmitted to the guardian terminal when the fourth score is more than a predetermined fourth reference value to notify that there is the risk situation in the indoor space.

In this case, according to an exemplary embodiment of the present disclosure, step S230 may include storing and holding a pre-designated first table, wherein, in the first table, a plurality of pre-designated first partial scores and pre-designated temperature range values corresponding to the plurality of first partial scores, respectively are recorded, and a pre-designated second table, wherein in the second table, a plurality of pre-designated second partial scores and pre-designated humidity range values corresponding to the plurality of second partial scores, respectively are recorded, for calculating a score representing an indoor discomfort level, storing and holding a pre-designated third table, wherein, in the third table, a plurality of pre-designated third partial scores and pre-designated fine dust range values corresponding to the plurality of third partial scores, respectively are recorded, and a pre-designated fourth table, wherein in the fourth table, a plurality of pre-designated fourth partial scores and pre-designated carbon dioxide range values corresponding to the plurality of fourth partial scores, respectively are recorded, for calculating a score representing an indoor pollution level, storing and holding a pre-designated fifth table, wherein, in the fifth table, a plurality of pre-designated fifth partial scores and pre-designated smoke range values corresponding to the plurality of fifth partial scores, respectively are recorded, for calculating a score representing fire risk level, when the n temperature measurement values, the n humidity measurement values, the n fine dust measurement values, the n carbon dioxide measurement values, the n smoke measurement values, and the n discrimination values are acquired, removing outliers for the n temperature measurement values, the n humidity measurement values, the n fine dust measurement values, the n carbon dioxide measurement values, the n smoke measurement values, respectively, computing a temperature average which is an average of remaining temperature measurement values in which outlier removal is performed among the n temperature measurement values, computing a humidity average which is an average of remaining humidity measurement values in which outlier removal is performed among the n humidity measurement values, computing a fine dust average which is an average of remaining fine dust measurement values in which outlier removal is performed among the n fine dust measurement values, computing a carbon dioxide average which is an average of remaining carbon dioxide measurement values in which outlier removal is performed among the n carbon dioxide measurement values, and computing a smoke average which is an average of remaining smoke measurement values in which outlier removal is performed among the n smoke measurement values, generating, as the first score, a sum of a partial score corresponding to a temperature range value to which the temperature average belongs among the plurality of first partial scores recorded in the first table, and a partial score corresponding to a humidity range value to which the humidity average belongs among the plurality of second partial scores recorded in the second table, generating, as the second score, a sum of a partial score corresponding to a fine dust range value to which the fine dust average belongs among the plurality of third partial scores recorded in the third table, and a partial score corresponding to a carbon dioxide range value to which the carbon dioxide average belongs among the plurality of fourth partial scores recorded in the fourth table, generating, as the third score, a partial score corresponding to a smoke range value to which the smoke average belongs among the plurality of fifth partial scores recorded in the fifth table, and generating, as the fourth score, the number of discrimination values determined as no motion detection among the n discrimination values.

In this case, according to an exemplary embodiment of the present disclosure, the performing of the outlier removal may include when the n temperature measurement values are acquired, computing a difference between a first quartile and a third quartile of the n temperature measurement values to calculate an interquartile range (IQR) for the n temperature measurement values, designating a first boundary value calculated according to Equation 1 above as a first temperature boundary value, and designating a second boundary value calculated according to Equation 2 above as a second temperature boundary value, based on the IQR for the n temperature measurement values to select a temperature measurement value which does not belong between the first temperature boundary value and the second temperature boundary value as an outlier among the n temperature measurement values, and then remove the outliers for the n temperature measurement values, when the n humidity measurement values are acquired, computing a difference between a first quartile and a third quartile of the n humidity measurement values to calculate an interquartile range for the n humidity measurement values, designating a first boundary value calculated according to Equation 1 above as a first humidity boundary value, and designating a second boundary value calculated according to Equation 2 above as a second humidity boundary value, based on the IQR for the n humidity measurement values to select a humidity measurement value which does not belong between the first humidity boundary value and the second humidity boundary value as the outlier among the n humidity measurement values, and then remove the outliers for the n humidity measurement values, when the n fine dust measurement values are acquired, computing a difference between a first quartile and a third quartile of the n fine dust measurement values to calculate an interquartile range for the n fine dust measurement values, designating a first boundary value calculated according to Equation 1 above as a first fine dust boundary value, and designating a second boundary value calculated according to Equation 2 above as a second fine dust boundary value, based on the IQR for the n fine dust measurement values to select a fine dust measurement value which does not belong between the first fine dust boundary value and the second fine dust boundary value as the outlier among the n fine dust measurement values, and then remove the outliers for the n fine dust measurement values, when the n carbon dioxide measurement values are acquired, computing a difference between a first quartile and a third quartile of the n carbon dioxide measurement values to calculate an interquartile range for the n carbon dioxide measurement values, designating a first boundary value calculated according to Equation 1 above as a first carbon dioxide boundary value, and designating a second boundary value calculated according to Equation 2 above as a second carbon dioxide boundary value, based on the IQR for the n carbon dioxide measurement values to select a carbon dioxide measurement value which does not belong between the first carbon dioxide boundary value and the second carbon dioxide boundary value as the outlier among the n carbon dioxide measurement values, and then remove the outliers for the n carbon dioxide measurement values, and when the n smoke measurement values are acquired, computing a difference between a first quartile and a third quartile of the n smoke measurement values to calculate an interquartile range for the n smoke measurement values, designating a first boundary value calculated according to Equation 1 above as a first smoke boundary value, and designating a second boundary value calculated according to Equation 2 above as a second smoke boundary value, based on the IQR for the n smoke measurement values to select a smoke measurement value which does not belong between the first smoke boundary value and the second smoke boundary value as the outlier among the n smoke measurement values, and then remove the outliers for the n smoke measurement values.

In this case, according to an exemplary embodiment of the present disclosure, the operating method of the management system apparatus may further include: generating a determination event for determining whether an emergency situation occurs when at least one notification message of the first notification message, the second notification message, the third notification message, and the fourth notification message is transmitted to the guardian terminal by step S240; when the determination event occurs, confirming which message of the first notification message, the second notification message, the third notification message, and the fourth notification message is transmitted to the guardian terminal; determining that the emergency situation occurs when it is confirmed that the first notification message and the second notification message are simultaneously transmitted to the guardian terminal, or the third notification message or the fourth notification message is transmitted, according to a confirmation result in the confirming, and determines that the emergency situation occurs only when it is confirmed that the first score is more than a predetermined first emergency reference value for determining the emergency situation for the indoor discomfort level or the second score is more than a predetermined second emergency reference value for determining an emergency situation for the indoor pollution level when it is confirmed that only the first notification message is transmitted to the guardian terminal or only the second notification message is transmitted according to the confirmation result in the confirming; and additionally transmitting an emergency notification message for notifying that there is a situation in which an emergency measure is required to the guardian terminal when it is determined that the emergency situation occurs according to the determination result in the determining.

In this case, according to an exemplary embodiment of the present disclosure, in the transmitting, the emergency notification message is repeatedly transmitted to the guardian terminal at a predetermined notification cycle interval until a confirmation response instruction for the emergency notification message is replied from the guardian terminal after the emergency notification message is transmitted to the guardian terminal, and transmission of the emergency notification message to the guardian terminal is stopped when the confirmation response instruction for the emergency notification message is replied from the guardian terminal.

Hereinabove, the operating method of the management system apparatus according to an exemplary embodiment of the present disclosure is described with reference to FIG. 2. Here, since the operating method of the management system apparatus according to an exemplary embodiment of the present disclosure may correspond to the configuration of the operation of the management system apparatus 110 described by using FIG. 1, a more detailed description thereof will be omitted.

The operating method of the management system apparatus according to an exemplary embodiment of the present disclosure may be implemented by a computer program stored in a storage medium for executing the computer program through coupling with a computer.

The operating method of the management system apparatus according to an exemplary embodiment of the present disclosure may be implemented in a program command type which may be performed through various computer means and recorded in a computer readable medium. The computer readable medium may include a program command, a data file, a data structure, etc., singly or combinationally. The program command recorded in the medium may be specially designed and configured for the present disclosure, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler.

As described above, the present disclosure has been described by specified matters such as detailed components, and the like and limited exemplary embodiments and drawings, but the description is just provided to assist more overall understanding of the present disclosure and the present disclosure is not limited to the exemplary embodiment and various modifications and changes can be made by those skilled in the art from such a disclosure.

Accordingly, the spirit of the present disclosure should not be defined only by the described exemplary embodiments, and it should be appreciated that claims to be described below and all things which are equivalent to the claims or equivalently modified to the claims are included in the scope of the spirit of the present disclosure.

What is claimed is:

1. A management system apparatus for performing determination of a risk situation in an indoor space, which includes a passive infrared human body detection sensor for detecting a human object present in the indoor space, a temperature sensor, a humidity sensor, a fine dust detection sensor, a carbon dioxide detection sensor, a smoke sensor, and a motion detection sensor, comprising:

a first determination event generation unit generating a first determination event for determining whether a risk situation is present exists in the indoor space at a predetermined determination cycle interval;

when the first determination event is generated, an acquisition unit checking whether the human object is detected in the indoor space through the passive infrared human body detection sensor, and when it is confirmed that the human object is detected as a result of the checking, acquires n, wherein n is a natural number of 2 or more, temperature measurement values, n humidity measurement values, n fine dust measurement values, n carbon dioxide measurement values, and n smoke measurement values measured continuously through the temperature sensor, the humidity sensor, the fine dust detection sensor, the carbon dioxide detection sensor, and the smoke sensor at the predetermined measurement cycle interval, and at the same time, acquiring n discrimination values related to whether motions measured continuously through the motion detection sensor at the measurement cycle interval are detected;

a score generation unit generating a first score representing an indoor discomfort level for the indoor space based on the n temperature measurement values and the n humidity measurement values, generating a second score representing an indoor pollution level for the indoor space based on the n fine dust measurement values and the n carbon dioxide measurement values, generating a third score representing a fire risk level in the indoor space based on the n smoke measurement values, and generating a fourth score for discriminating whether the motion of the human object is abnormal based on the n discrimination values; and a notification transmission unit transmitting a first notification message indicating that the indoor discomfort level in the indoor space is high to a predetermined guardian terminal when the first score is more than a predetermined first reference value, transmitting a second notification message indicating that an indoor pollution level in the indoor space is high to the guardian terminal when the second score is more than a predetermined second reference value, transmitting a third notification message indicating that there is a fire risk in the indoor space to the guardian terminal when the third score is more than a predetermined third reference value, and transmitting a fourth notification message indicating that the motion of the human object is abnormal to the guardian terminal when the fourth score is more than a predetermined fourth reference value to notify that there is the risk situation in the indoor space.

2. The management system apparatus of claim 1, wherein the score generation unit includes a first holding unit storing and holding a pre-designated first table, wherein, in the first table, a plurality of pre-designated first partial scores and pre-designated temperature range values corresponding to the plurality of first partial scores, respectively are recorded, and a pre-designated second table, wherein in the second table, a plurality of pre-designated second partial scores and pre-designated humidity range values corresponding to the plurality of second partial scores, respectively are recorded, for calculating a score representing an indoor discomfort level, a second holding unit storing and holding a pre-designated third table, wherein, in the third table, a plurality of pre-designated third partial scores and pre-designated fine dust range values corresponding to the plurality of third partial scores, respectively are recorded, and a pre-designated fourth table, wherein in the fourth table, a plurality of pre-designated fourth partial scores and pre-designated carbon dioxide range values corresponding to the plurality of fourth partial scores, respectively are recorded, for calculating a score representing an indoor pollution level, a third holding unit storing and holding a pre-designated fifth table, wherein, in the fifth table, a plurality of pre-designated fifth partial scores and pre-designated smoke range values corresponding to the plurality of fifth partial scores, respectively are recorded, for calculating a score representing fire risk level, when the n temperature measurement values, the n humidity measurement values, the n fine dust measurement values, the n carbon dioxide measurement values, the n smoke measurement values, and the n discrimination values are acquired, an outlier removal performing unit removing outliers for the n temperature measurement values, the n humidity measurement values, the n fine dust measurement values, the n carbon dioxide measurement values, the n smoke measurement values, respectively, an average computation unit computing a temperature average which is an average of remaining temperature measurement values in which outlier removal is performed among the n temperature measurement values, computing a humidity average which is an average of remaining humidity measurement values in which outlier removal is performed among the n humidity measurement values, computing a fine dust average which is an average of remaining fine dust measurement values in which outlier removal is performed among the n fine dust measurement values, computing a carbon dioxide average which is an average of remaining carbon dioxide measurement values in which outlier removal is performed among the n carbon dioxide measurement values, and computing a smoke average which is an average of remaining smoke measurement values in which outlier removal is performed among the n smoke measurement values, a first scoring unit generating, as the first score, a sum of a partial score corresponding to a temperature range value to which the temperature average belongs among the plurality of first partial scores recorded in the first table, and a partial score corresponding to a humidity range value to which the humidity average belongs among the plurality of second partial scores recorded in the second table, a second scoring unit generating, as the second score, a sum of a partial score corresponding to a fine dust range value to which the fine dust average belongs among the plurality of third partial scores recorded in the third table, and a partial score corresponding to a carbon dioxide range value to which the carbon dioxide average belongs among the plurality of fourth partial scores recorded in the fourth table, a third scoring unit generating, as the third score, a partial score corresponding to a smoke range value to which the smoke average belongs among the plurality of fifth partial scores recorded in the fifth table, and a fourth scoring unit generating, as the fourth score, the number of discrimination values determined as no motion detection among the n discrimination values.

3. The management system apparatus of claim 2, wherein the outlier removal performing unit includes when the n temperature measurement values are acquired, a temperature outlier removal unit computing a difference between a first quartile and a third quartile of the n temperature measurement values to calculate an interquartile range (IQR) for the n temperature measurement values, designating a first boundary value calculated according to Equation 1 below as a first temperature boundary value, and designating a second boundary value calculated according to Equation 2 below as a second temperature boundary value, based on the IQR for the n temperature measurement values to select a temperature measurement value which does not belong between the first temperature boundary value and the second temperature boundary value as an outlier among the n temperature measurement values, and then remove the outliers for the n temperature measurement values, when the n humidity measurement values are acquired, a humidity outlier removal unit computing a difference between a first quartile and a third quartile of the n humidity measurement values to calculate an interquartile range for the n humidity measurement values, designating a first boundary value calculated according to Equation 1 below as a first humidity boundary value, and designating a second boundary value calculated according to Equation 2 below as a second humidity boundary value, based on the IQR for the n humidity measurement values to select a humidity measurement value which does not belong between the first humidity boundary value and the second humidity boundary value as the outlier among the n humidity measurement values, and then remove the outliers for the n humidity measurement values, when the n fine dust measurement values are acquired, a fine dust outlier removal unit computing a difference between a first quartile and a third quartile of the n fine dust measurement values to calculate an interquartile range for the n fine dust measurement values, designating a first boundary value calculated according to Equation 1 below as a first fine dust boundary value, and designating a second boundary value calculated according to Equation 2 below as a second fine dust boundary value, based on the IQR for the n fine dust measurement values to select a fine dust measurement value which does not belong between the first fine dust boundary value and the second fine dust boundary value as the outlier among the n fine dust measurement values, and then remove the outliers for the n fine dust measurement values, when the n carbon dioxide measurement values are acquired, a carbon dioxide outlier removal unit computing a difference between a first quartile and a third quartile of the n carbon dioxide measurement values to calculate an interquartile range for the n carbon dioxide measurement values, designating a first boundary value calculated according to Equation 1 below as a first carbon dioxide boundary value, and designating a second boundary value calculated according to Equation 2 below as a second carbon dioxide boundary value, based on the IQR for the n carbon dioxide measurement values to select a carbon dioxide measurement value which does not belong between the first carbon dioxide boundary value and the second carbon dioxide boundary value as the outlier among the n carbon dioxide measurement values, and then remove the outliers for the n carbon dioxide measurement values, and when the n smoke measurement values are acquired, a smoke outlier removal unit computing a difference between a first quartile and a third quartile of the n smoke measurement values to calculate an interquartile range for the n smoke measurement values, designating a first boundary value calculated according to Equation 1 below as a first smoke boundary value, and designating a second boundary value calculated according to Equation 2 below as a second smoke boundary value, based on the IQR for the n smoke measurement values to select a smoke measurement value which does not belong between the first smoke boundary value and the second smoke boundary value as the outlier among the n smoke measurement values, and then remove the outliers for the n smoke measurement values, $$B1 = Q1 - 1.5 \times IQR \qquad \text{[Equation 1]}$$

Where B1 means a first boundary value, Q1 means a first quartile, and IQR means an interquartile range, $$B2 = Q2 + 1.5 \times IQR \quad \text{[Equation 2]}$$

Where B2 means a second boundary value, Q2 means the third quartile, and IQR means an interquartile range.

4. The management system apparatus of claim 1, further comprising:

a second determination event generation unit generating a second determination event for determining whether an emergency situation occurs when at least one notification message of the first notification message, the second notification message, the third notification message, and the fourth notification message is transmitted to the guardian terminal by the notification transmission unit;

when the second determination event occurs, a confirmation unit confirming which message of the first notification message, the second notification message, the third notification message, and the fourth notification message is transmitted to the guardian terminal;

a determination unit determining that the emergency situation occurs when it is confirmed that the first notification message and the second notification message are simultaneously transmitted to the guardian terminal, or the third notification message or the fourth notification message is transmitted, according to a confirmation result of the confirmation unit, and determines that the emergency situation occurs only when it is confirmed that the first score is more than a predetermined first emergency reference value for determining the emergency situation for the indoor discomfort level or the second score is more than a predetermined second emergency reference value for determining an emergency situation for the indoor pollution level when it is confirmed that only the first notification message is transmitted to the guardian terminal or only the second notification message is transmitted according to the confirmation result of the confirmation unit; and a message transmission unit additionally transmitting an emergency notification message for notifying that there is a situation in which an emergency measure is required to the guardian terminal when it is determined that the emergency situation occurs according to the determination result of the determination unit.

5. The management system apparatus of claim 4, wherein the message transmission unit repeatedly transmits the emergency notification message to the guardian terminal at a predetermined notification cycle interval until a confirmation response instruction for the emergency notification message is replied from the guardian terminal after the emergency notification message is transmitted to the guardian terminal, and stops transmission of the emergency notification message to the guardian terminal when the confirmation response instruction for the emergency notification message is replied from the guardian terminal.

6. An operating method of a management system apparatus for performing determination of a risk situation in an indoor space, which includes a passive infrared human body detection sensor for detecting a human object present in the indoor space, a temperature sensor, a humidity sensor, a fine dust detection sensor, a carbon dioxide detection sensor, a smoke sensor, and a motion detection sensor, comprising:

generating a first determination event for determining whether a risk situation is present exists in the indoor space at a predetermined determination cycle interval;

when the first determination event is generated, checking whether the human object is detected in the indoor space through the passive infrared human body detection sensor, and when it is confirmed that the human object is detected as a result of the checking, acquires n, wherein n is a natural number of 2 or more, temperature measurement values, n humidity measurement values, n fine dust measurement values, n carbon dioxide measurement values, and n smoke measurement values measured continuously through the temperature sensor, the humidity sensor, the fine dust detection sensor, the carbon dioxide detection sensor, and the smoke sensor at the predetermined measurement cycle interval, and at the same time, acquiring n discrimination values related to whether motions measured continuously through the motion detection sensor at the measurement cycle interval are detected;

generating a first score representing an indoor discomfort level for the indoor space based on the n temperature measurement values and the n humidity measurement values, generating a second score representing an indoor pollution level for the indoor space based on the n fine dust measurement values and the n carbon dioxide measurement values, generating a third score representing a fire risk level in the indoor space based on the n smoke measurement values, and generating a fourth score for discriminating whether the motion of the human object is abnormal based on the n discrimination values; and transmitting a first notification message indicating that the indoor discomfort level in the indoor space is high to a predetermined guardian terminal when the first score is more than a predetermined first reference value, transmitting a second notification message indicating that an indoor pollution level in the indoor space is high to the guardian terminal when the second score is more than a predetermined second reference value, transmitting a third notification message indicating that there is a fire risk in the indoor space to the guardian terminal when the third score is more than a predetermined third reference value, and transmitting a fourth notification message indicating that the motion of the human object is abnormal to the guardian terminal when the fourth score is more than a predetermined fourth reference value to notify that there is the risk situation in the indoor space.

7. The operating method of claim 6, wherein the generating the score includes storing and holding a pre-designated first table, wherein, in the first table, a plurality of pre-designated first partial scores and pre-designated temperature range values corresponding to the plurality of first partial scores, respectively are recorded, and a pre-designated second table, wherein in the second table, a plurality of pre-designated second partial scores and pre-designated humidity range values corresponding to the plurality of second partial scores, respectively are recorded, for calculating a score representing an indoor discomfort level, storing and holding a pre-designated third table, wherein, in the third table, a plurality of pre-designated third partial scores and pre-designated fine dust range values corresponding to the plurality of third partial scores, respectively are recorded, and a pre-designated fourth table, wherein in the fourth table, a plurality of pre-designated fourth partial scores and pre-designated carbon dioxide range values corresponding to the plurality of fourth partial scores, respectively are recorded, for calculating a score representing an indoor pollution level, storing and holding a pre-designated fifth table, wherein, in the fifth table, a plurality of pre-designated fifth partial scores and pre-designated smoke range values corresponding to the plurality of fifth partial scores, respectively are recorded, for calculating a score representing fire risk level, when the n temperature measurement values, the n humidity measurement values, the n fine dust measurement values, the n carbon dioxide measurement values, the n smoke measurement values, and the n discrimination values are acquired, removing outliers for the n temperature measurement values, the n humidity measurement values, the n fine dust measurement values, the n carbon dioxide measurement values, the n smoke measurement values, respectively, computing a temperature average which is an average of remaining temperature measurement values in which outlier removal is performed among the n temperature measurement values, computing a humidity average which is an average of remaining humidity measurement values in which outlier removal is performed among the n humidity measurement values, computing a fine dust average which is an average of remaining fine dust measurement values in which outlier removal is performed among the n fine dust measurement values, computing a carbon dioxide average which is an average of remaining carbon dioxide measurement values in which outlier removal is performed among the n carbon dioxide measurement values, and computing a smoke average which is an average of remaining smoke measurement values in which outlier removal is performed among the n smoke measurement values, generating, as the first score, a sum of a partial score corresponding to a temperature range value to which the temperature average belongs among the plurality of first partial scores recorded in the first table, and a partial score corresponding to a humidity range value to which the humidity average belongs among the plurality of second partial scores recorded in the second table, generating, as the second score, a sum of a partial score corresponding to a fine dust range value to which the fine dust average belongs among the plurality of third partial scores recorded in the third table, and a partial score corresponding to a carbon dioxide range value to which the carbon dioxide average belongs among the plurality of fourth partial scores recorded in the fourth table, generating, as the third score, a partial score corresponding to a smoke range value to which the smoke average belongs among the plurality of fifth partial scores recorded in the fifth table, and generating, as the fourth score, the number of discrimination values determined as no motion detection among the n discrimination values.

8. The operating method of claim 7, wherein the performing of the outlier removal includes when the n temperature measurement values are acquired, computing a difference between a first quartile and a third quartile of the n temperature measurement values to calculate an interquartile range (IQR) for the n temperature measurement values, designating a first boundary value calculated according to Equation 1 below as a first temperature boundary value, and designating a second boundary value calculated according to Equation 2 below as a second temperature boundary value, based on the IQR for the n temperature measurement values to select a temperature measurement value which does not belong between the first temperature boundary value and the second temperature boundary value as an outlier among the n temperature measurement values, and then remove the outliers for the n temperature measurement values, when the n humidity measurement values are acquired, computing a difference between a first quartile and a third quartile of the n humidity measurement values to calculate an interquartile range for the n humidity measurement values, designating a first boundary value calculated according to Equation 1 below as a first humidity boundary value, and designating a second boundary value calculated according to Equation 2 below as a second humidity boundary value, based on the IQR for the n humidity measurement values to select a humidity measurement value which does not belong between the first humidity boundary value and the second humidity boundary value as the outlier among the n humidity measurement values, and then remove the outliers for the n humidity measurement values, when the n fine dust measurement values are acquired, computing a difference between a first quartile and a third quartile of the n fine dust measurement values to calculate an interquartile range for the n fine dust measurement values, designating a first boundary value calculated according to Equation 1 below as a first fine dust boundary value, and designating a second boundary value calculated according to Equation 2 below as a second fine dust boundary value, based on the IQR for the n fine dust measurement values to select a fine dust measurement value which does not belong between the first fine dust boundary value and the second fine dust boundary value as the outlier among the n fine dust measurement values, and then remove the outliers for the n fine dust measurement values, when the n carbon dioxide measurement values are acquired, computing a difference between a first quartile and a third quartile of the n carbon dioxide measurement values to calculate an interquartile range for the n carbon dioxide measurement values, designating a first boundary value calculated according to Equation 1 below as a first carbon dioxide boundary value, and designating a second boundary value calculated according to Equation 2 below as a second carbon dioxide boundary value, based on the IQR for the n carbon dioxide measurement values to select a carbon dioxide measurement value which does not belong between the first carbon dioxide boundary value and the second carbon dioxide boundary value as the outlier among the n carbon dioxide measurement values, and then remove the outliers for the n carbon dioxide measurement values, and when the n smoke measurement values are acquired, computing a difference between a first quartile and a third quartile of the n smoke measurement values to calculate an interquartile range for the n smoke measurement values, designating a first boundary value calculated according to Equation 1 below as a first smoke boundary value, and designating a second boundary value calculated according to Equation 2 below as a second smoke boundary value, based on the IQR for the n smoke measurement values to select a smoke measurement value which does not belong between the first smoke boundary value and the second smoke boundary value as the outlier among the n smoke measurement values, and then remove the outliers for the n smoke measurement values, $$B1 = Q1 - 1.5 \times IQR \quad \text{[Equation 1]}$$

Where B1 means a first boundary value, Q1 means a first quartile, and IQR means an interquartile range, $$B2 = Q2 + 1.5 \times IQR \quad \text{[Equation 2]}$$

Where B2 means a second boundary value, Q2 means the third quartile, and IQR means an interquartile range.

9. The operating method of claim 6, further comprising:

generating a second determination event for determining whether an emergency situation occurs when at least one notification message of the first notification message, the second notification message, the third notification message, and the fourth notification message is transmitted to the guardian terminal;

when the second determination event occurs, confirming which message of the first notification message, the second notification message, the third notification message, and the fourth notification message is transmitted to the guardian terminal;

determining that the emergency situation occurs when it is confirmed that the first notification message and the second notification message are simultaneously transmitted to the guardian terminal, or the third notification message or the fourth notification message is transmitted, according to a confirmation result in the confirming, and determines that the emergency situation occurs only when it is confirmed that the first score is more than a predetermined first emergency reference value for determining the emergency situation for the indoor discomfort level or the second score is more than a predetermined second emergency reference value for determining an emergency situation for the indoor pollution level when it is confirmed that only the first notification message is transmitted to the guardian terminal or only the second notification message is transmitted according to the confirmation result in the confirming; and additionally transmitting an emergency notification message for notifying that there is a situation in which an emergency measure is required to the guardian terminal when it is determined that the emergency situation occurs according to the determination result in the determining.

10. The operating method of claim 9, wherein in the additionally transmitting, the emergency notification message is repeatedly transmitted to the guardian terminal at a predetermined notification cycle interval until a confirmation response instruction for the emergency notification message is replied from the guardian terminal after the emergency notification message is transmitted to the guardian terminal, and transmission of the emergency notification message to the guardian terminal is stopped when the confirmation response instruction for the emergency notification message is replied from the guardian terminal.

11. A non-transitory computer readable recording medium having a program recorded therein for allowing a computer to execute an operating method of a management system apparatus for performing determination of a risk situation in an indoor space, which includes a passive infrared human body detection sensor for detecting a human object present in the indoor space, a temperature sensor, a humidity sensor, a fine dust detection sensor, a carbon dioxide detection sensor, a smoke sensor, and a motion detection sensor, comprising:

generating a first determination event for determining whether a risk situation is present exists in the indoor space at a predetermined determination cycle interval;

when the first determination event is generated, checking whether the human object is detected in the indoor space through the passive infrared human body detection sensor, and when it is confirmed that the human object is detected as a result of the checking, acquires n, wherein n is a natural number of 2 or more, temperature measurement values, n humidity measurement values, n fine dust measurement values, n carbon dioxide measurement values, and n smoke measurement values measured continuously through the temperature sensor, the humidity sensor, the fine dust detection sensor, the carbon dioxide detection sensor, and the smoke sensor at the predetermined measurement cycle interval, and at the same time, acquiring n discrimination values related to whether motions measured continuously through the motion detection sensor at the measurement cycle interval are detected;

generating a first score representing an indoor discomfort level for the indoor space based on the n temperature measurement values and the n humidity measurement values, generating a second score representing an indoor pollution level for the indoor space based on the n fine dust measurement values and the n carbon dioxide measurement values, generating a third score representing a fire risk level in the indoor space based on the n smoke measurement values, and generating a fourth score for discriminating whether the motion of the human object is abnormal based on the n discrimination values; and transmitting a first notification message indicating that the indoor discomfort level in the indoor space is high to a predetermined guardian terminal when the first score is more than a predetermined first reference value, transmitting a second notification message indicating that an indoor pollution level in the indoor space is high to the guardian terminal when the second score is more than a predetermined second reference value, transmitting a third notification message indicating that there is a fire risk in the indoor space to the guardian terminal when the third score is more than a predetermined third reference value, and transmitting a fourth notification message indicating that the motion of the human object is abnormal to the guardian terminal when the fourth score is more than a predetermined fourth reference value to notify that there is the risk situation in the indoor space.

* * * * *